US012741539B2

(12) United States Patent
Iguma et al.

(10) Patent No.: US 12,741,539 B2

(45) Date of Patent: Sep. 22, 2026

(54) DRIVING FORCE CONTROL DEVICE

(71) Applicant: TOYOTA JIDOSHA KABUSHIKI KAISHA, Toyota (JP)

(72) Inventors: Hiroki Iguma, Shizuoka-ken (JP); Akira Hibino, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 18/538,024

(22) Filed: Dec. 13, 2023

(65) Prior Publication Data

US 2024/0262207 A1 Aug. 8, 2024

(30) Foreign Application Priority Data

Feb. 8, 2023 (JP) ................................ 2023-017917

(51) Int. Cl.
*B60L 3/00* (2019.01)

(52) U.S. Cl.
CPC ....... *B60L 3/0023* (2013.01); *B60L 2240/421* (2013.01); *B60L 2240/423* (2013.01)

(58) Field of Classification Search
None
See application file for complete search history.

(56) References Cited

U.S. PATENT DOCUMENTS 6,586,898 B2 * 7/2003 King ......................... H02P 8/40 318/400.34
2003/0177846 A1 * 9/2003 Tamagawa .............. G01M 1/30 73/862.29
2007/0101965 A1 * 5/2007 Asahara ................ F02D 35/024 477/3
2015/0180386 A1 * 6/2015 Enoki ....................... H02P 6/10 318/400.23

FOREIGN PATENT DOCUMENTS

JP 2003-284207 A 10/2003
JP 2008072868 A * 3/2008
JP 4661744 B2 3/2011
JP 2012-154253 A 8/2012

* cited by examiner

*Primary Examiner* — Hitesh Patel
*Assistant Examiner* — Wenyuan Yang
(74) *Attorney, Agent, or Firm* — SoraIP, Inc.

(57) ABSTRACT

A driving force control device in which, based on the rotational speed of the motor mounted on the vehicle, it is determined whether resonance occurs in the vehicle with respect to the road, and when it is determined that resonance occurs in the vehicle, the torque of the motor is limited. Only the fluctuation component of the rotation speed is extracted from the rotation speed of the motor with a band-pass filter. When limiting the torque of the motor, the torque reduction is started at the timing of 270 degrees in the phase of the waveform which regards the extracted fluctuation component as the COS waveform.

2 Claims, 8 Drawing Sheets

DRIVING FORCE CONTROL DEVICE

CROSS-REFERENCE TO RELATED APPLICATION

This application claims priority to Japanese Patent Application No. 2023-017917 filed on Feb. 8, 2023, incorporated herein by reference in its entirety.

BACKGROUND

1. Technical Field

The present disclosure relates to a driving force control device.

2. Description of Related Art

In Japanese Patent No. 4661744 (JP 4661744 B), a driving force control device is disclosed in which it is determined whether resonance occurs in a vehicle body, based on an amount of change in a motor rotation speed, and when it is determined that the resonance has occurred in the vehicle body, motor torque is limited.

SUMMARY

In a configuration described in JP 4661744 B, a resonance counter is incremented when the amount of change in the motor rotation speed is large, and the motor torque is limited when a resonance counter value exceeds a predetermined value. When a timing for starting torque limitation is based on the resonance counter, a phase of rotational fluctuation is not taken into consideration, and there is a possibility that the resonance cannot be suppressed depending on a timing.

The present disclosure was made in view of the above circumstances, and it is an object of the present disclosure to provide a driving force control device capable of suppressing resonance of a vehicle in a state in which a motor is driven.

The present disclosure is a driving force control device that determines whether resonance occurs in a vehicle with respect to a traveling road, based on a rotation speed of a motor mounted on the vehicle, and limits torque of the motor when determination is made that the resonance occurs in the vehicle in which:

- only a fluctuation component of the rotation speed is extracted from the rotation speed of the motor with a band-pass filter; and
- when the torque of the motor is limited, torque reduction is started at a timing of 270 degrees in a phase of a waveform in which the extracted fluctuation component is regarded as a cosine waveform.

According to this configuration, the timing to start the torque reduction of the torque of the motor is controlled based on the phase of the waveform in which the fluctuation component of the motor rotation speed is regarded as the cosine waveform, in a state in which the motor is driven. As a result, the resonance of the vehicle can be suppressed.

Further, when a timing at which the determination is made that the resonance occurs in the vehicle is 0 degrees or more and less than 270 degrees in the phase of the waveform in which the fluctuation component is regarded as the cosine waveform, the torque reduction may be started at a timing when the phase becomes 270 degrees.

According to this configuration, since the torque reduction start timing is a phase effective for suppressing torsional vibration of a rotating member, the resonance of the vehicle can be suppressed.

In addition, the present disclosure is a driving force control device that determines whether resonance occurs in a vehicle with respect to a traveling road, based on a rotation speed of a motor mounted on the vehicle, and limits torque of the motor when determination is made that the resonance occurs in the vehicle in which: only a fluctuation component of the rotation speed is extracted from the rotation speed of the motor with a band-pass filter;

- when the torque of the motor is limited, a timing to start torque reduction is controlled based on a phase of a waveform in which the extracted fluctuation component is regarded as a cosine waveform; and
- when a timing at which the determination is made that the resonance occurs in the vehicle is 270 degrees or more and less than 360 degrees in the phase of the waveform in which the fluctuation component is regarded as the cosine waveform, the torque reduction is started immediately.

According to this configuration, the resonance of the vehicle can be suppressed by immediately reducing the torque, when the phase is an effective phase for suppressing the torsional vibration of the rotating member, based on the phase of the vibration.

In the present disclosure, the timing to start torque reduction of the torque of the motor is controlled based on the phase of the waveform in which the fluctuation component of the motor rotation speed is regarded as the cosine waveform, in a state in which the motor is driven. As a result, the resonance of the vehicle can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A driving force control device according to an embodiment of the present disclosure will be specifically described below. The present disclosure is not limited to the embodiments described below.

Figure 1:
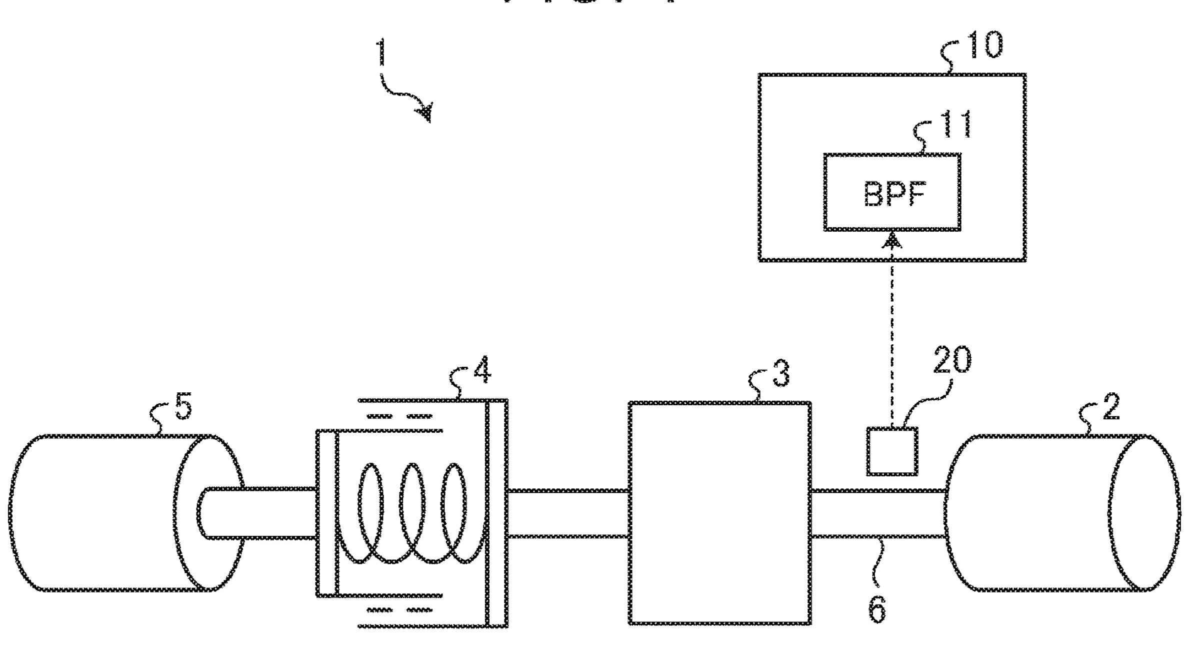
FIG. 1 is a schematic diagram for explaining a vehicle in an embodiment.

FIG. 1 is a schematic diagram for explaining a vehicle according to an embodiment. A vehicle 1 includes a motor 2, a transmission 3, a drive shaft 4, wheels 5 and a control device 10.

A vehicle 1 is an electrified vehicle having a motor 2 as a power source. The motor 2 is a driving motor and is driven by electric power supplied from a battery mounted on the vehicle 1. When the motor 2 is driven, power of the motor 2 is transmitted to the transmission 3. The transmission 3 is a power transmission mechanism provided between the motor 2 and the drive shaft 4. The drive shaft 4 is connected with the wheel 5 so that power transmission is possible. In vehicle 1, power output from motor 2 is transmitted to wheels 5 via transmission 3 and drive shaft 4. In addition, the motor 2 functions as a generator by causing the motor 2 to rotate by an external force input from the wheels 5. The motor 2 is a motor generator (MG) capable of functioning as an electric motor and a generator.

A control device 10 is an electronic control device that controls the motor 2. The control device 10 includes a control section and a storage section. A signal is input to the control device 10 from a motor rotation speed sensor 20. The motor rotation speed sensor 20 is a sensor that detects the rotation speed of the motor 2 (hereinafter referred to as motor rotation speed). The motor rotation speed sensor 20 detects the rotation speed of a rotating member that rotates integrally with the rotor shaft of the motor 2 and outputs the detection signal to the control device 10. For example, a motor rotation speed sensor 20 is provided on a rotating shaft that connects the motor 2 and the transmission 3. Based on the signal input from the motor rotation speed sensor 20, the control device 10 detects the motor rotation speed and controls the torque of the motor 2 (hereinafter referred to as motor torque).

The control device 10 also includes a band-pass filter (BPF) 11. The band-pass filter 11 is a filter circuit that passes signals in a specific frequency band. The control device 10 uses the band-pass filter 11 to extract the fluctuation component of the resonance frequency from the motor rotation speed. In the control device 10, the signal from the motor rotation speed sensor 20 is input to the band-pass filter 11, so that the rotation speed fluctuation component can be extracted from the motor rotation speed. Then, the control device 10 controls the timing of starting torque reduction of the motor torque based on the fluctuation component of the motor rotation speed.

When the control device 10 detects that the vehicle 1 is traveling on an undulating road, the control device 10 limits the driving force (motor torque) of the motor 2 to protect the parts. Specifically, the control device 10 determines whether the vehicle 1 resonates with respect to the travel road based on the motor rotation speed. The control device 10 determines whether resonance occurs in the vehicle 1 by determining whether or not the fluctuation value of the motor rotation speed exceeds a threshold value. The threshold is a preset value. Then, when it is determined that resonance occurs in the vehicle 1, the control device 10 executes driving force control to limit the driving force. In this driving force control, the control device 10 reduces the motor torque in consideration of the phase of vibration. As a result, the peak value of resonance torque can be reduced more effectively. Thus, the control device 10 is a driving force control device that controls the torque of the motor 2.

Specifically, the control device 10 extracts only the fluctuation component of the rotation speed from the motor rotation speed with the band-pass filter 11, and the timing when the waveform regarding the fluctuation component as the cosine (COS) waveform changes from the negative direction to the positive direction, that is, Torque down is started at zero timing when the fluctuation value of the motor rotation speed in the COS waveform changes from a negative value to a positive value.

The torque-down timing refers to the timing at which torque is actually generated from the motor 2. In the vehicle 1, if there is a communication delay between ECUs, a calculation delay, or a phase delay due to the band-pass filter 11, the control device 10 outputs a torque command in consideration of the dead time.

Figure 2:
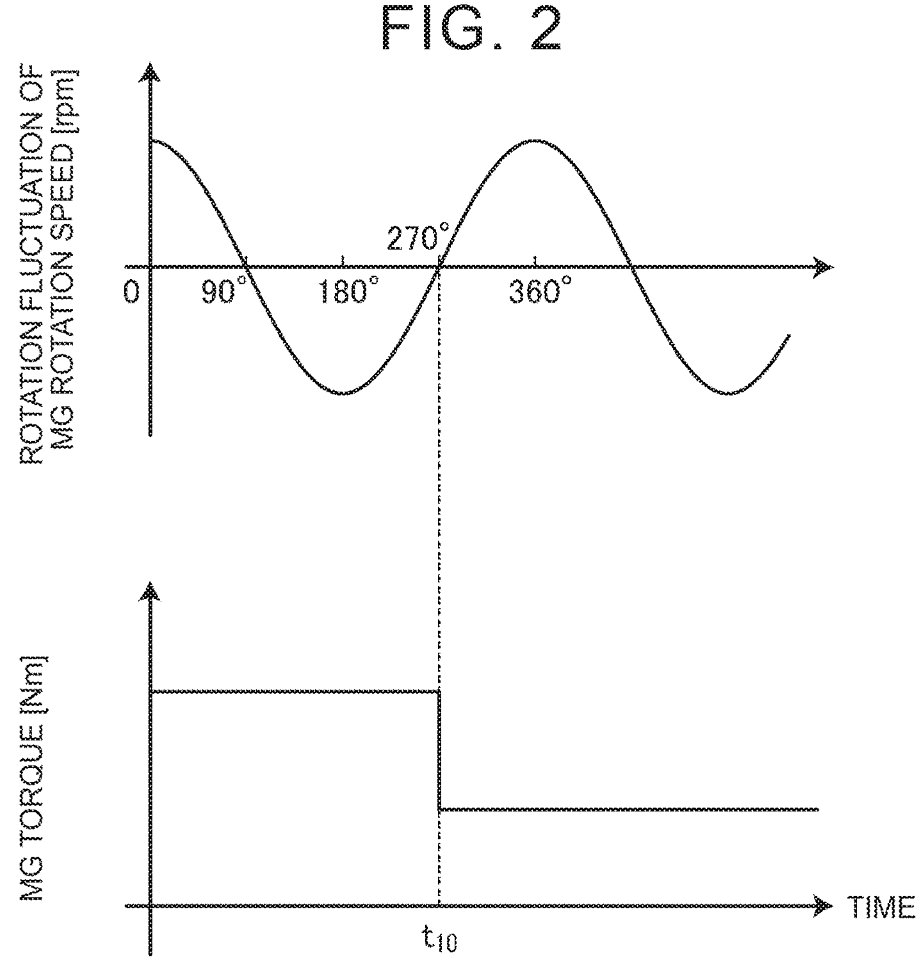
FIG. 2 is a diagram for explaining a waveform in which the fluctuation component of the motor rotation speed is regarded as a COS waveform and the start timing of torque reduction.

As shown in FIG. 2, in a waveform in which the fluctuation component of the motor rotation speed (rotational fluctuation of the MG rotation speed) is regarded as a COS waveform, the waveform changes from the negative direction to the positive direction at the timing when the phase reaches 270 degrees. The control device 10 sets the timing at which the phase becomes 270 degrees as the optimum timing to start reducing the motor torque. If the torque reduction of the motor torque is started at the timing when the phase becomes 90 degrees, the torque reduction will be step input at the timing of exciting the torsional vibration, which will have the opposite effect of suppressing the resonance. On the other hand, when the torque reduction of the motor torque is started at the timing when the phase becomes 270 degrees, the torsional vibration can be suppressed.

Therefore, when it is determined that resonance occurs in the vehicle 1, the control device 10 starts torque reduction of the motor torque at the timing when the phase of the waveform regarding the fluctuation component of the motor rotation speed as the COS waveform becomes 270 degrees. Let As shown in FIG. 2, at time t10, the phase of the waveform obtained by regarding the fluctuation component of the motor rotation speed as the COS waveform reaches 270 degrees, so the control device 10 starts torque reduction of the motor torque at this timing. Since this 270-degree phase is an effective phase for suppressing torsional vibration, resonance can be suppressed.

Figure 3:
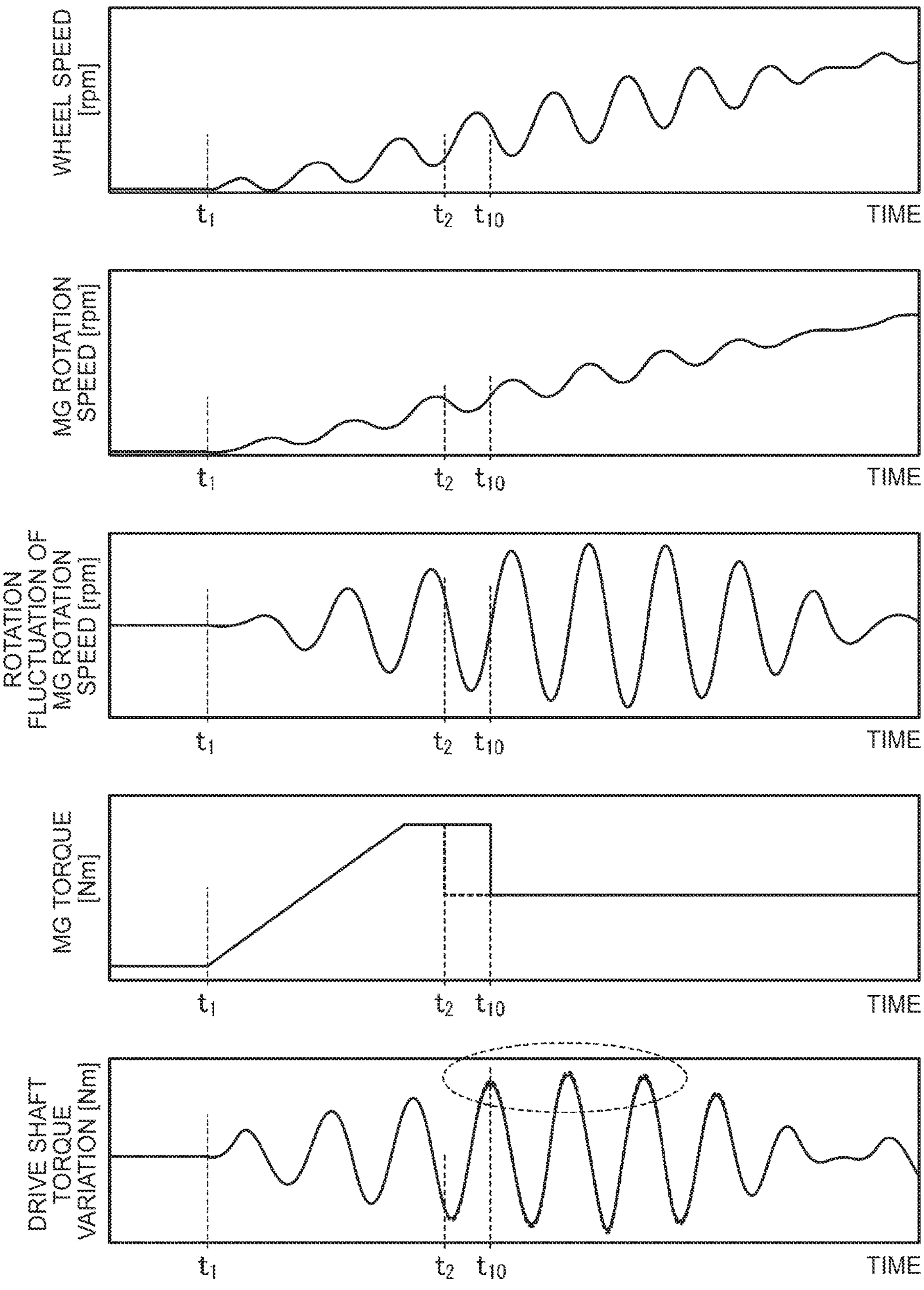
FIG. 3 is a time chart diagram for explaining the case where the torque down start timing is controlled in consideration of the phase of the waveform in which the fluctuation component of the motor rotation speed is regarded as a COS waveform.

FIG. 3 is a diagram for comparatively explaining the timing of starting the torque reduction of the motor torque. FIG. 3 shows the rotation speed of the wheel 5 (wheel speed), the motor rotation speed (MG rotation speed), the fluctuation component of the motor rotation speed (rotation fluctuation of the MG rotation speed), the motor torque (MG torque), the drive Torque fluctuations of the drive shaft 4 are shown. The graph of the rotation fluctuation of the MG rotation speed shows the motor rotation speed extracted by the resonance frequency band-pass filter 11. Further, FIG. 3 shows a comparative example in which the torque reduction is performed only by determining the threshold without considering the phase, as indicated by the dashed lines in the graph of the MG torque and the graph of the torque fluctuation of the drive shaft 4. An embodiment of the control device 10 is shown in solid lines in the MG torque graph and the drive shaft 4 torque variation graph.

As shown in FIG. 3, after time t1, when the motor torque begins to increase in response to an acceleration request, the vehicle 1 travels on a wavy road, causing torsional vibration in the drive shaft 4, which reduces the motor rotation speed. Rotation fluctuation occurs. When the control device 10 determines that resonance occurs in the vehicle 1, the control device 10 starts torque reduction of the motor torque at the timing when the phase is 270 degrees when the fluctuation component of the motor rotation speed is regarded as a COS waveform (time t10). On the other hand, in the comparative example, torque reduction of the motor torque is started at time t2 before time t10. Time t2 is the timing when the waveform regarding the fluctuation component of the motor rotation speed as a COS waveform changes from the positive direction to the negative direction, that is, the timing around immediately before zero when the fluctuation value of the motor rotation speed in the COS waveform changes from a positive value to a negative value.

Figure 4:
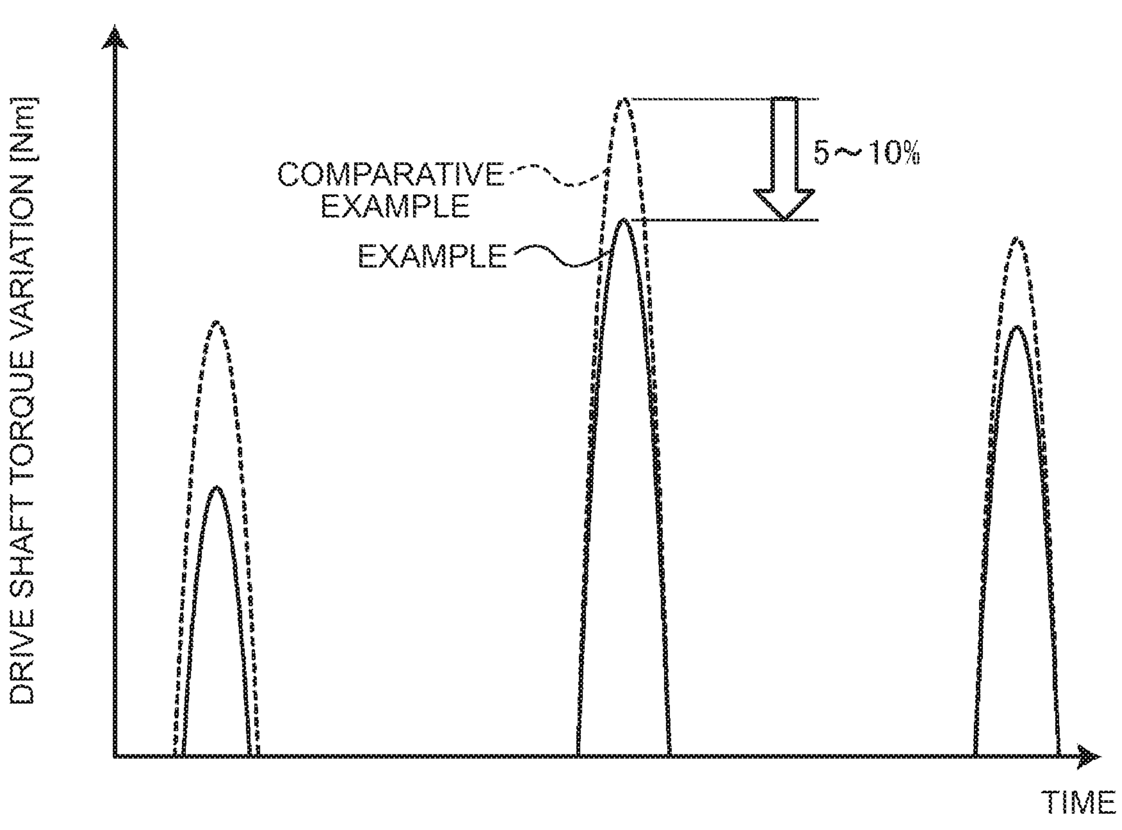
FIG. 4 is an enlarged view of the vicinity of the peak of the torque fluctuation of the drive shaft in FIG. 3.

When the control (example) by the control device 10 and the control (comparative example) by the comparative example are compared, as shown in FIG. 4, in the example, the peak torque of the drive shaft 4 can be decreased 5 to 10%, compared to that in the comparative example.

Figure 5:
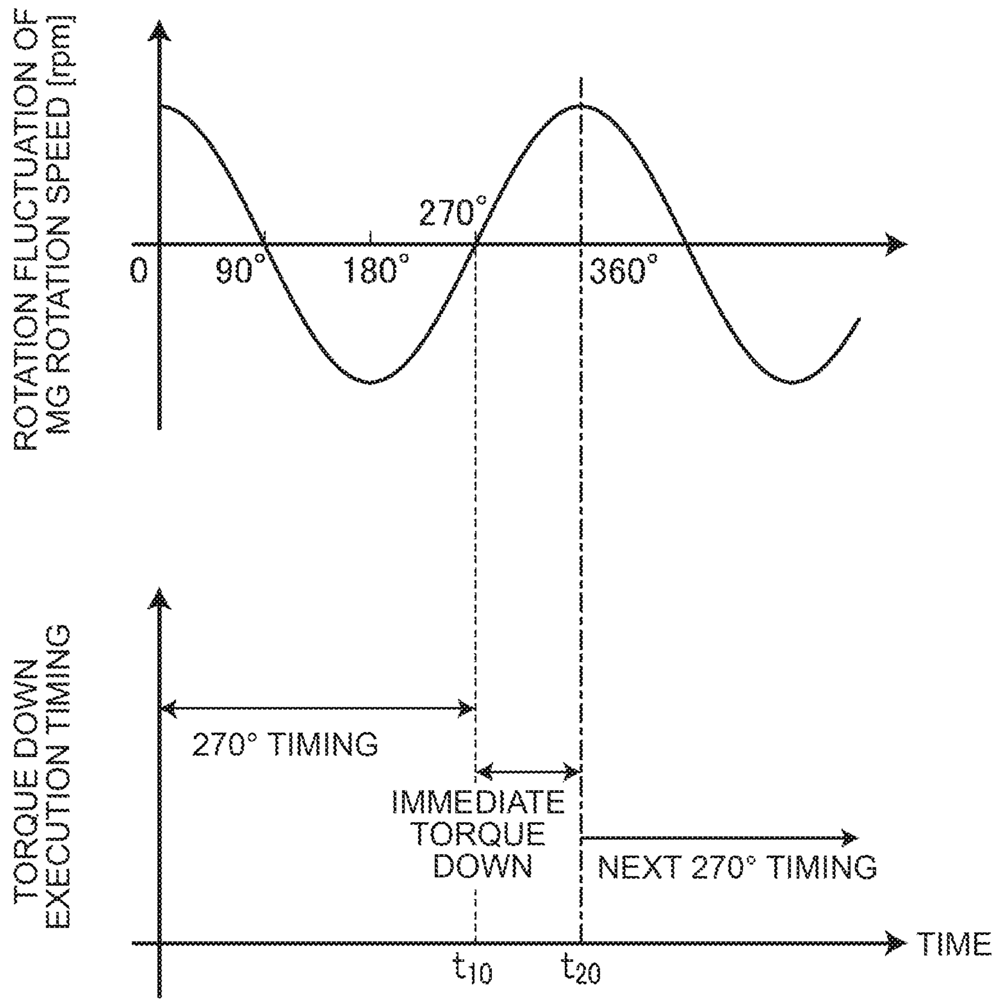
FIG. 5 is a diagram for explaining the start timing of torque reduction.

Further, as shown in FIG. 5, even if the optimal timing for starting torque reduction has passed, the control device 10 can control Torque down is immediately performed, and when the other positive peak value is passed, torque down is started at zero timing when the fluctuation value next changes from negative to positive.

If the timing at which it is determined that the vehicle 1 will resonate is included in a period in which the phase of the waveform obtained by regarding the fluctuation component of the motor rotation speed as the COS waveform is 0 degrees or more and less than 270 degrees, the control device 10 determines that the phase is 270 degrees, torque down is started. If the timing at which it is determined that the vehicle 1 will resonate is within a phase period of 0 degrees or more and less than 270 degrees, the control device 10 waits until the phase reaches 270 degrees to start torque reduction. As a result, the phase is effective for suppressing torsional vibration of the drive shaft 4, so resonance of the vehicle 1 can be suppressed.

Figure 6:
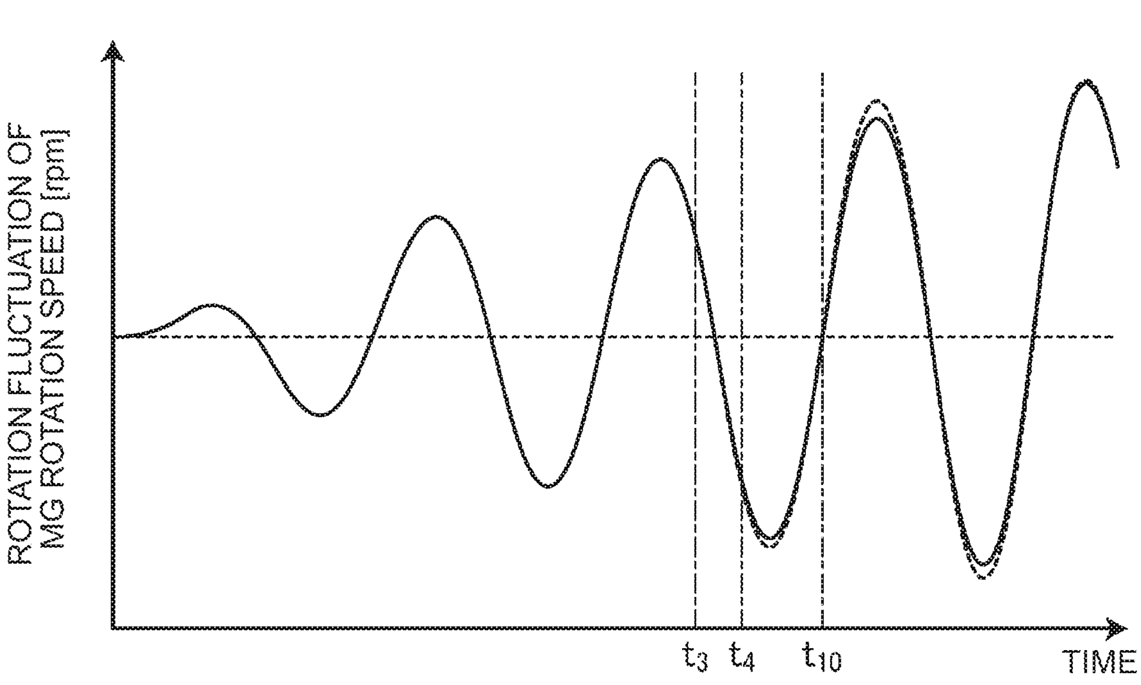
FIG. 6 is a time chart diagram for explaining the case where the torque down start timing is controlled in consideration of the phase of the waveform in which the fluctuation component of the motor rotation speed is regarded as a COS waveform.
Figure 6:
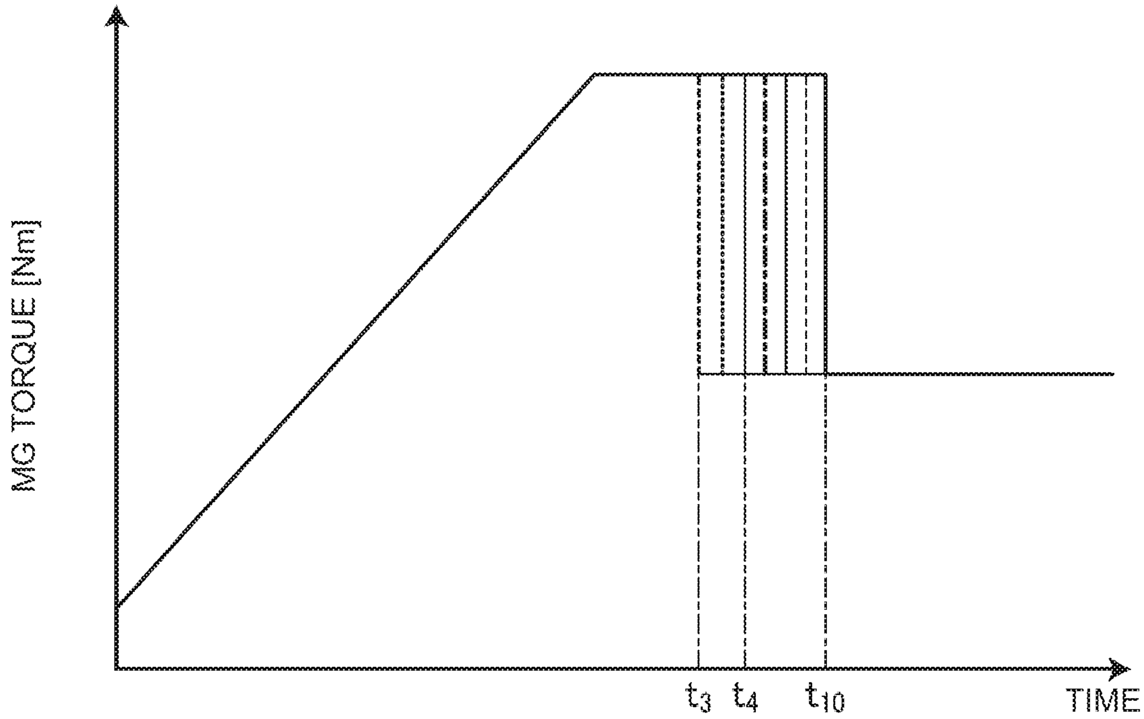
Figure 7:
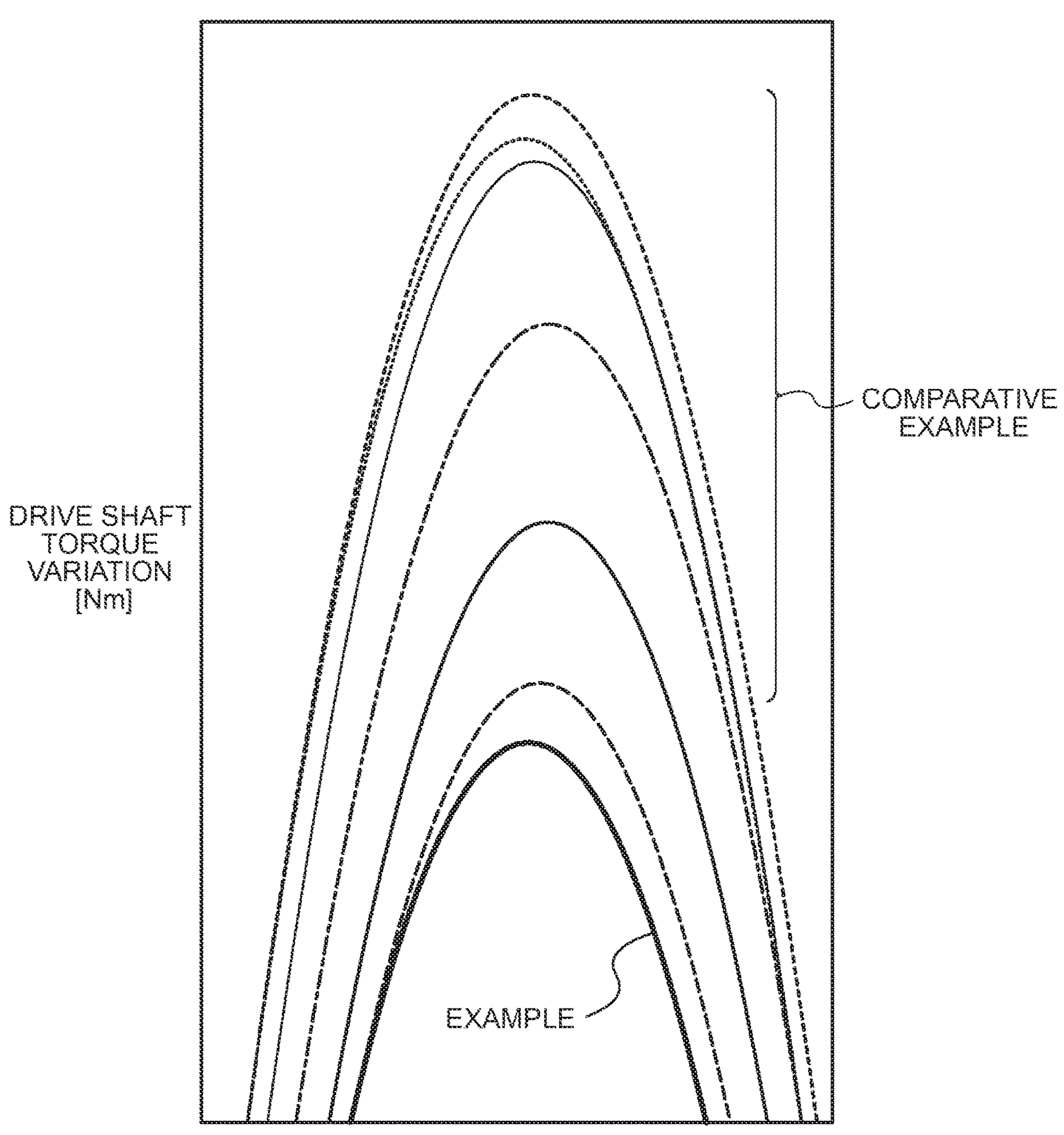
FIG. 7 is an enlarged view of the vicinity of the peak of the torque fluctuation of the drive shaft in FIG. 6.

As shown in FIG. 6, in the comparative example, the motor torque was reduced at various timings during the phase period of 0 degrees or more and less than 270 degrees. On the other hand, when it is determined that resonance will occur in the vehicle 1 within a period in which the phase is 0 degrees or more and less than 270 degrees, the control device 10 starts torque reduction at the timing of the next phase of 270 degrees. As a result, as shown in FIG. 7, compared to the case where the torque reduction was started immediately within the period in which the phase was 0 degrees or more and less than 270 degrees (comparative example), the torque reduction was started after waiting until the timing of 270 degrees. When starting (Example), the peak value is the lowest.

Furthermore, when the timing at which it is determined that resonance occurs in the vehicle 1 is included in a period in which the phase of the waveform obtained by regarding the fluctuation component of the motor rotation speed as the COS waveform is 270 degrees or more and less than 360 degrees, the control device 10 immediately start torque down. The control device 10 controls the timing of starting the torque reduction of the motor torque based on the phase of the waveform that regards the fluctuation component of the motor rotation speed as the COS waveform while the motor 2 is being driven.

If the timing at which it is determined that the resonance occurs in the vehicle 1 is included in a period in which the phase of the waveform obtained by regarding the fluctuation component of the motor rotation speed as the COS waveform is 270 degrees or more and less than 360 degrees, the control device 10 immediately Start torque down. The control device 10 immediately starts torque reduction when the timing at which it is determined that the vehicle 1 will resonate is within a period in which the phase is equal to or greater than 270 degrees and less than 360 degrees. If the phase is greater than or equal to 270 degrees and less than 360 degrees, it is better to torque down immediately rather than waiting for the next 270 degrees. After that, it waits until the next 270 degrees to start torque down. As a result, the peak torque of the drive shaft 4 can be reduced, and torsional vibration can be effectively suppressed, so resonance of the vehicle 1 can be suppressed.

Figure 8:
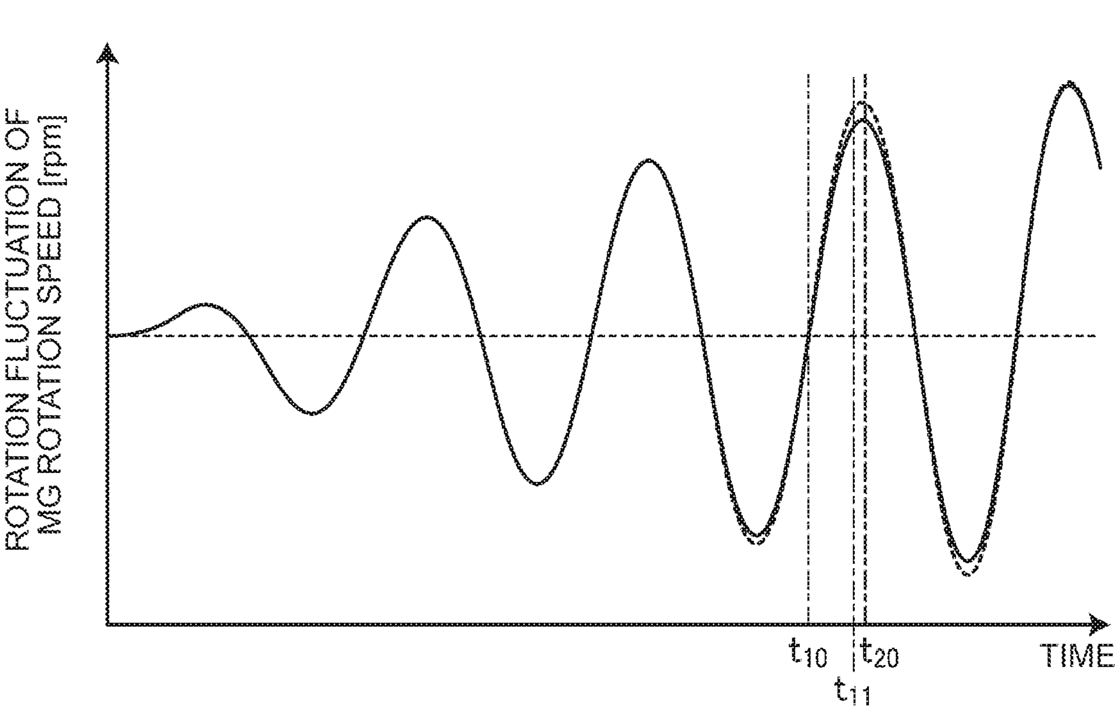
FIG. 8 is a time chart diagram for explaining the case where the torque reduction start timing is controlled in consideration of the phase of a waveform in which the fluctuation component of the motor rotation speed is regarded as a COS waveform.
Figure 8:
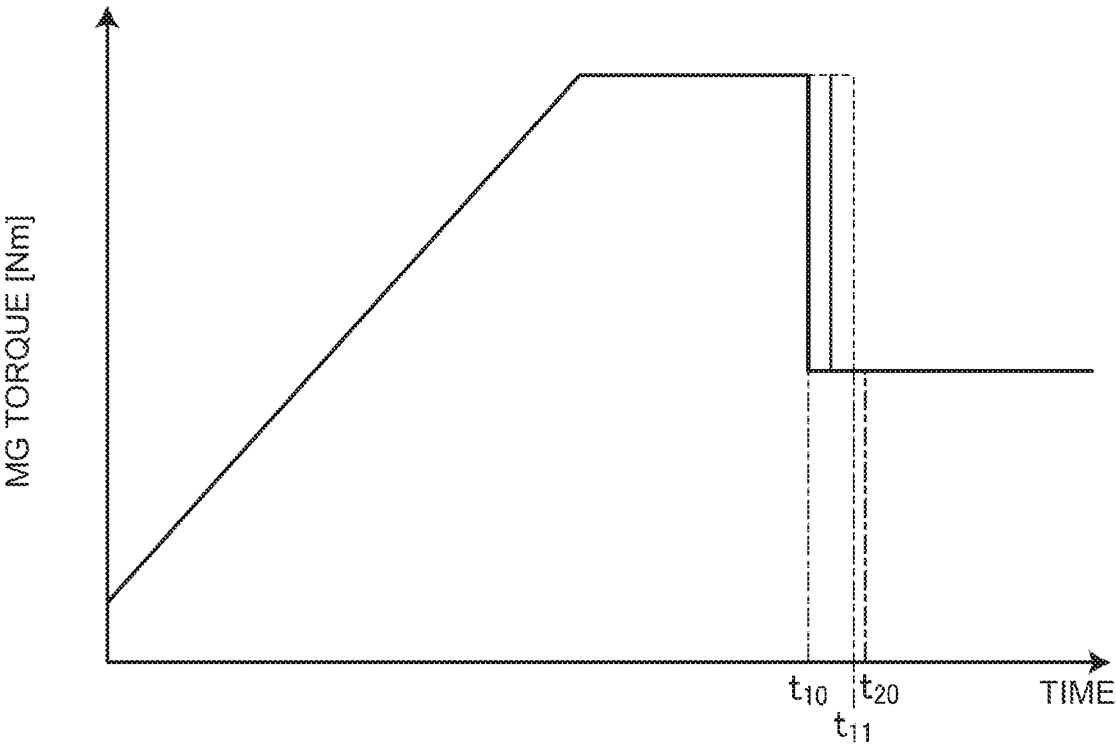
Figure 9:
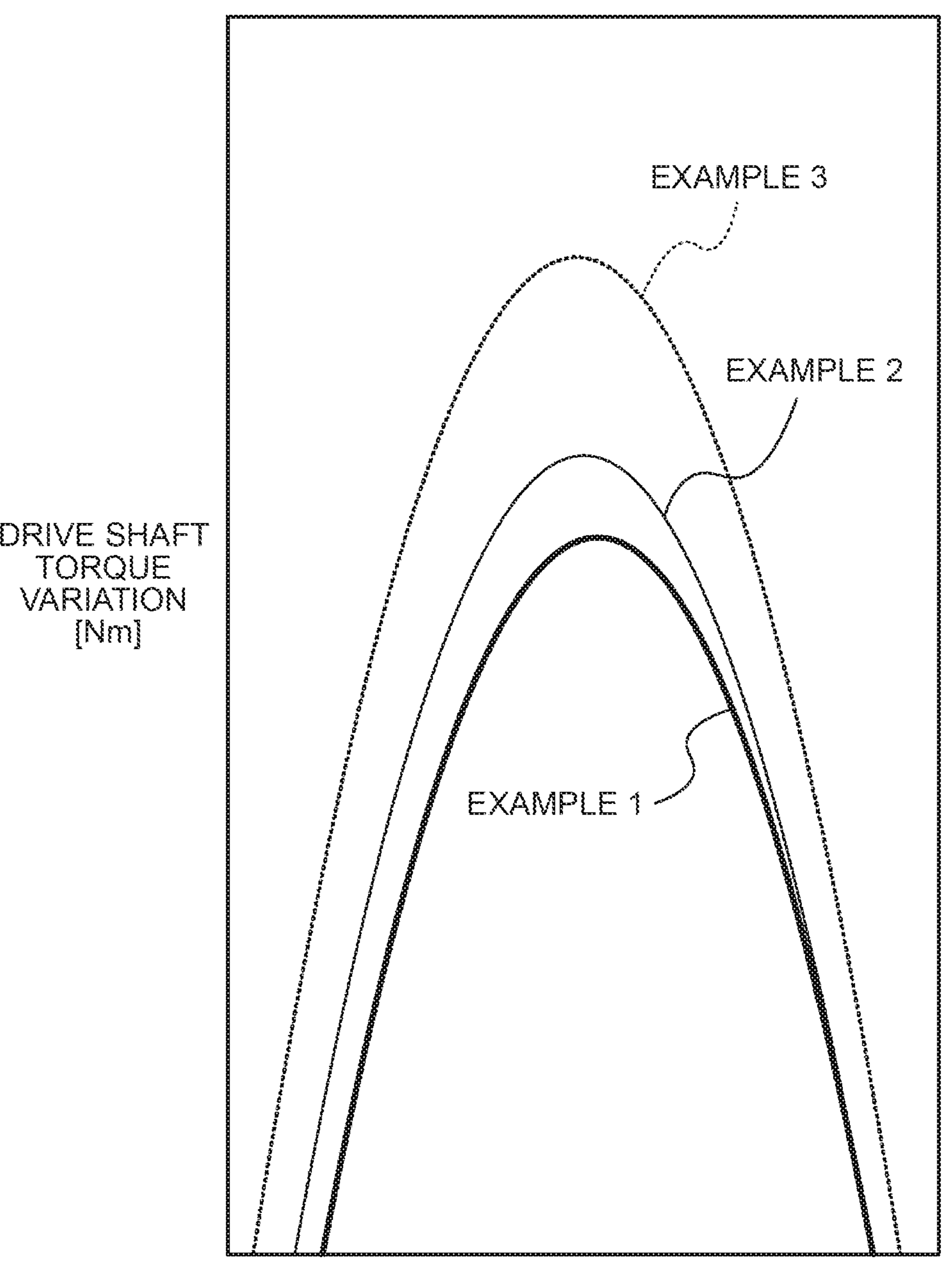
FIG. 9 is an enlarged view of the vicinity of the peak of the torque fluctuation of the drive shaft in FIG. 8.

As shown in FIG. 8, the control device 10 immediately started torque reduction of the motor torque at three timings during the phase period of 270 degrees or more and less than 360 degrees. As a result, as shown in FIG. 9, when immediate torque reduction is started within a period in which the phase is 270 degrees or more and less than 360 degrees (Examples 1 to 3), the peak value is kept low.

As described above, according to the embodiment, the peak value of the resonance torque can be suppressed more effectively by limiting the torque in consideration of the phase of vibration.

The vehicle 1 may be any electrified vehicle having a motor 2 as a power source, and may be a battery electric vehicle (BEV) or a hybrid electric vehicle (HEV).

What is claimed is:

1. A driving force control device comprising an electronic control unit configured to determine whether resonance occurs in a vehicle with respect to a traveling road, based on a rotation speed of a motor mounted on the vehicle, and limit torque of the motor when determination is made that the resonance occurs in the vehicle, wherein:

only a fluctuation component of the rotation speed is extracted from the rotation speed of the motor with a band-pass filter;

when the torque of the motor is limited, torque reduction is started at a timing of 270 degrees in a phase of a waveform in which the extracted fluctuation component is regarded as a cosine waveform; and when a timing at which the determination is made that the resonance occurs in the vehicle is 0 degrees or more and less than 270 degrees in the phase of the waveform in which the fluctuation component is regarded as the cosine waveform, the torque reduction is started at a timing when the phase becomes 270 degrees.

2. A driving force control device, comprising:

an electronic control device comprising a control section and a storage section, the electronic control device being configured to acquire a rotational speed of a motor mounted on a vehicle; and a band-pass filter configured to extract a fluctuation component of the rotational speed from the rotational speed of a motor mounted on a vehicle, the extracted fluctuation component being represented by a cosine waveform, wherein the electronic control device is further configured to detect that the vehicle is traveling on an undulating road, determine whether the rotational speed exceeds a threshold value, in response to a detection that the vehicle is traveling on the undulating road, obtain a phase of the cosine waveform at a timing when a determination is made that the rotational speed exceeds the threshold value, determine whether the obtained phase falls within a first scope and a second scope, the first scope being from 270 degrees to less than 360 degrees, and the second scope being from 0 degrees to less than 270 degrees, in a case where a first determination is made that the obtained phase falls within the first scope, execute a torque reduction of the motor immediately after the first determination is made, and in a case where a second determination is made that the obtained phase falls within the second scope, execute the torque reduction at a timing when the phase reaches 270 degrees.

* * * * *